United States Patent
Biernat

(10) Patent No.: US 12,552,358 B2
(45) Date of Patent: Feb. 17, 2026

(54) PURGE VALVE FOR AN AIR-DRYING DEVICE AND AIR-DRYING DEVICE AND PRESSURIZED AIR-BASED SYSTEM AND COMMERCIAL VEHICLE

(71) Applicant: ZF CV SYSTEMS EUROPE BV, Brussels (BE)

(72) Inventor: Marcin Biernat, Bozkow (PL)

(73) Assignee: ZF CV SYSTEMS EUROPE BV, Brussels (BE)

( * ) Notice: Subject to any disclaimer, the term of this patent is extended or adjusted under 35 U.S.C. 154(b) by 799 days.

(21) Appl. No.: 17/900,145

(22) Filed: Aug. 31, 2022

(65) Prior Publication Data
US 2023/0065461 A1    Mar. 2, 2023

(30) Foreign Application Priority Data
Aug. 31, 2021    (EP) ................... 21194048

(51) Int. Cl.
*B60T 17/00*    (2006.01)
*B01D 53/26*    (2006.01)
(Continued)

(52) U.S. Cl.
CPC ............ *B60T 17/004* (2013.01); *B01D 53/26* (2013.01); *F16K 17/04* (2013.01); *F16K 24/04* (2013.01);
(Continued)

(58) Field of Classification Search
None
See application file for complete search history.

(56) References Cited

U.S. PATENT DOCUMENTS

| 5,286,283 A | 2/1994 | Goodell |
| 6,730,143 B1 | 5/2004 | Nichols et al. |
| (Continued) | | |

FOREIGN PATENT DOCUMENTS

| CN | 101044047 A | 9/2007 |
| CN | 104315210 A | 1/2015 |
| (Continued) | | |

OTHER PUBLICATIONS

KR900006425B1-preview (IP.com machine translation of Tsutsumi) (Year: 1990).*
(Continued)

*Primary Examiner* — Gabriel E Gitman
(74) *Attorney, Agent, or Firm* — WARNER NORCROSS + JUDD LLP

(57) ABSTRACT

A purge valve with an integrated safety function, suitable for an air-drying device. In the purge valve a purge-valve body forms a first exhaust passage for connecting an inlet line to an outlet line. A purge-valve piston is arranged inside the purge-valve body to control a flow of exhaust air through the first exhaust passage upon reception of a purge signal. The purge-valve piston comprises a through opening being configured to form a second exhaust passage for connecting the inlet line to the outlet line. A valve member is arranged in the through opening and is configured to control a flow of exhaust air through the second exhaust passage. The valve member is configured to be actuated by pressurized air when a pressure value in the inlet line exceeds a threshold actuation pressure.

14 Claims, 8 Drawing Sheets

(51) Int. Cl.
*F16K 11/10* (2006.01)
*F16K 17/04* (2006.01)
*F16K 24/04* (2006.01)
*F16K 31/122* (2006.01)

(52) U.S. Cl.
CPC .......... *F16K 31/1221* (2013.01); *B01D 2259/40086* (2013.01); *F16K 11/10* (2013.01); *F16K 2200/30* (2021.08); *F16K 2200/40* (2021.08)

(56) References Cited

U.S. PATENT DOCUMENTS

| | | |
|---|---|---|
| 2004/0094036 A1 | 5/2004 | Nichols et al. |
| 2007/0028777 A1 | 2/2007 | Hoffman et al. |
| 2009/0038476 A1 | 2/2009 | Blackwood et al. |
| 2009/0309413 A1 | 12/2009 | Bensch et al. |
| 2010/0186827 A1 | 7/2010 | Ertl |
| 2013/0333782 A1 | 12/2013 | Schnittger et al. |
| 2014/0077109 A1 | 3/2014 | Miyashita et al. |
| 2019/0212757 A1 | 7/2019 | Ratatics et al. |

FOREIGN PATENT DOCUMENTS

| | | |
|---|---|---|
| CN | 104349956 A | 2/2015 |
| CN | 105822531 A | 8/2016 |
| CN | 206749787 U | 12/2017 |
| CN | 210289968 U | 4/2020 |
| CN | 111237517 A | 6/2020 |
| DE | 102005057004 B3 | 4/2007 |
| DE | 102006041010 A1 | 3/2008 |
| EP | 0530019 A2 | 3/1993 |
| EP | 1595764 A1 | 11/2005 |
| EP | 3556621 A1 | 10/2019 |
| KR | 900006425 B1 * | 8/1990 ............ B01D 53/26 |
| WO | 9846464 A1 | 10/1998 |
| WO | 2016117166 A1 | 7/2016 |
| WO | 2018050400 A1 | 3/2018 |
| WO | 2019115045 A1 | 6/2019 |

OTHER PUBLICATIONS

Machine assisted English translation of CN104315210A obtained from https://patents.google.com/patent on Feb. 3, 2025, 7 pages.
Machine assisted English translation of EP1595764A1 obtained from https://patents.google.com/patent on Feb. 3, 2025, 13 pages.
Machine assisted English translation of EP3556621A1 obtained from https://patents.google.com/patent on Feb. 3, 2025, 13 pages.
Machine assisted English translation of WO2016117166A1 obtained from https://patents.google.com/patent on Feb. 3, 2025, 12 pages.
Machine assisted English translation of WO2019115045A1 obtained from https://patents.google.com/patent on Feb. 3, 2025, 8 pages.
English translation of CN104349956A obtained from <https://worldwide.espacenet.com/patent> on Jun. 23, 2025, 15 pages.
English translation of CN111237517A obtained from https://worldwide.espacenet.com/patent on Jun. 23, 2025, 16 pages.
English translation of CN206749787U obtained from https://worldwide.espacenet.com/patent on Jun. 23, 2025, 7 pages.
English translation of CN210289968U obtained from https://patents.google.com/patent on Jun. 23, 2025, 5 pages.
Machine assisted English translation of CN105822531A obtained from https://patents.google.com/patent on Aug. 30, 2022, 7 pages.

* cited by examiner

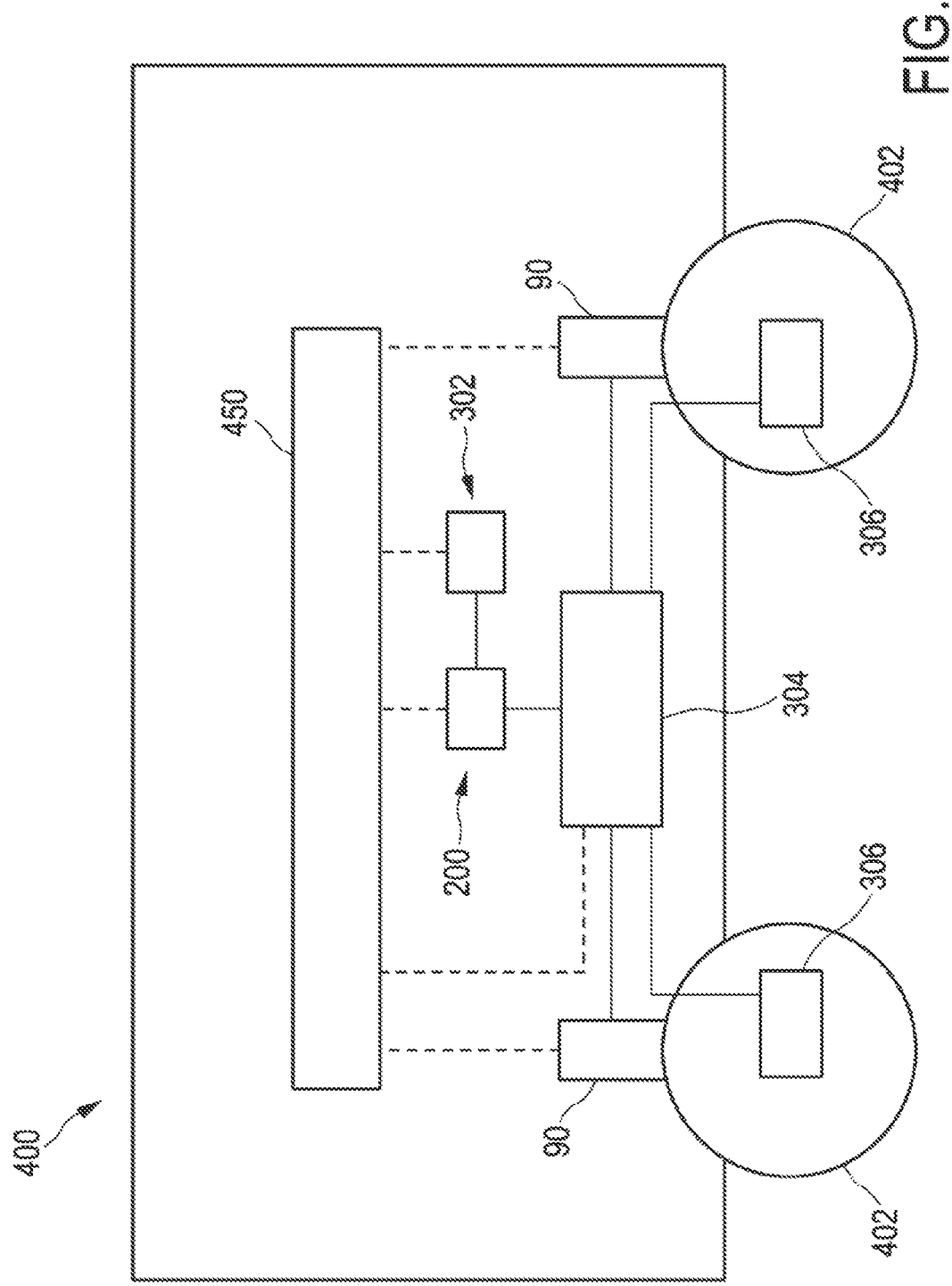

PURGE VALVE FOR AN AIR-DRYING DEVICE AND AIR-DRYING DEVICE AND PRESSURIZED AIR-BASED SYSTEM AND COMMERCIAL VEHICLE

CROSS-REFERENCE TO RELATED APPLICATIONS

This application claims priority to and all advantages of European Patent Application No. 21194048.1, filed on 31 Aug. 2021, the contents of which are hereby incorporated by reference.

FIELD OF THE DISCLOSURE

The invention is directed to a purge valve. The invention also leads to an air-drying device including the purge valve, and to a pressurized air-based system and to a commercial vehicle including the same.

BACKGROUND

Purge valves are generally known in the art. Such a purge valve for an air-drying device comprises:
- a purge-valve body forming a first exhaust passage for connecting an inlet line to an outlet line connected to an exterior of the purge valve; wherein
- a purge-valve piston is arranged inside the purge-valve body to control a flow of exhaust air from the inlet line through the first exhaust passage to the outlet line; wherein the purge-valve piston is actuable upon reception of a purge signal.

U.S. Pat. No. 6,730,143 B1 basically describes such a purge valve as mentioned in the introduction. The purge valve described therein is part of an air-dryer where desiccant material is periodically purged of its moisture by a reverse purge flow of air. A purge valve is provided for opening a purge air exhaust port that communicates with the environment.

Further, typically it is known in the art in air-drying devices without a dedicated safety valve, that the purge valve can be arranged to further operate as a safety valve. For purging, a regeneration or solenoid valve provides an air signal that causes an air pressure to act against a spring force for opening the purge valve. In addition to its operation in a purging phase described above, the overpressure from the main chamber of the air dryer acts on a smaller area of the piston against the same spring force. A balance between both piston's surfaces is designed to ensure proper sealing performance and full opening during the regeneration phase, also referred to as purging phase. Normally, the opening pressure of the purge-valve piston acting as a safety valve has to be set much higher than a cut-out pressure (usually 4 bar higher) to protect the purge valve against external leakage during normal vehicle operation. At the same time, it assures air dryer tightness considering spring relaxation during its lifetime. Such a high difference between maximal device working and safety function opening pressures reduces the possibility of use of integrated safety valves, especially where no big difference between cut-out/maximal working and safety valve opening pressure is expected.

Safety of pressurized-air based systems and their user is a key aspect. According to Pressure Equipment Directive 97/23/EC (PED), in particular in section 2.10 "Protection against exceeding the allowable limits of pressure equipment": where, under reasonably foreseeable conditions, the allowable limits could be exceeded, the pressure equipment must be fitted with, or provision made for the fitting of, suitable protective devices, unless the equipment is intended to be protected by other protective devices within an assembly. The suitable device or combination of such devices must be determined on the basis of the particular characteristics of the equipment or assembly. Suitable protective devices and combinations thereof comprise:
  (a) safety accessories as defined in Article 1, section 2.1.3,
  (b) where appropriate, adequate monitoring devices such as indicators and/or alarms which enable adequate action to be taken either automatically or manually to keep the pressure equipment within the allowable limits.

Further, according to Pressure Equipment Directive PED 2014/68/EU, safety accessories are devices designed to protect pressure equipment against exceeding the allowable limits (pressure, temperature, water level, etc.). The suitability of the device or combination of devices is determined on the basis of the particular characteristics of the equipment or assembly. For example, a combination of a level gauge and a pressure relief system.

It would be beneficial to provide a purge-valve with integrated safety valve with less a purging function and a safety valve function that is able to operate with smaller pressure differences between maximal working pressure and opening pressure of the safety valve.

BRIEF SUMMARY

A purge valve is disclosed herein. The purge valve is particularly suitable for an air-drying device. The purge valve comprises a purge-valve body that forms a first exhaust passage for connecting an inlet line to an outlet line that connects to an exterior of the purge valve. The purge valve comprises a purge-valve piston that is arranged inside the purge-valve body and configured to control a flow of exhaust air from the inlet line, through the first exhaust passage, to the outlet line. The purge-valve piston is actuable upon reception of a purge signal.

The purge-valve piston further comprises a through opening that is configured to form a second exhaust passage for connecting the inlet line to the outlet line. The second exhaust passage is established separately from the first exhaust passage. Further, a valve member is arranged in the through opening. The valve member is configured to control a flow of exhaust air through the second exhaust passage. The valve member is arranged and configured to be actuated by pressurized air when a pressure value of the pressurized air in the inlet line exceeds a predetermined threshold actuation pressure.

In the purge valve according to the invention a second exhaust passage is present, which, as in the case of the first exhaust passages, connects the inlet line to the outlet line. Said second exhaust passage is formed by a through opening in the purge-valve piston. The purge-valve piston controls flow of exhaust air through the first exhaust passage upon reception of a purge signal. The valve member that is configured to control the flow of exhaust air via the second exhaust passage is located in the through opening, which is in turn arranged and configured to bypass the valve seat of the of the purge valve, i.e., the position where, in a closed state, the purge-valve piston in cooperation with the purge-valve body closes the first exhaust passage. By providing a second exhaust passage, that is independently controllable, differences between maximal working pressure during normal purging operation and opening pressure of the valve member acting as a safety valve in case an overpressure is present, can be reduced.

In the following, developments of the purge valve of the first aspect of the invention will be described.

In a preferred development, the valve member comprises a valve-body that is formed by the purge-valve piston.

In another development, the valve member that is arranged in the through opening comprises a valve-piston configured to actuate against a spring force of a valve spring element. Preferably, the valve spring element is also arranged inside the through opening of the purge-valve piston.

In a particular development, the valve member further comprises an adjusting nut, preferably completely or at least partially arranged inside the through opening. The adjusting nut has a substantially cylindrical outer shape and comprises an annular recess for housing the valve spring element. It also comprises a central recess arranged and configured to house a piston rod that is attached to the valve-piston. This provides guidance and stability to the different elements of the valve member. Also, the opening pressure of the integrated valve member can be set by the spring force adjusted by the adjusting nut.

In yet another development of the purge valve of the first aspect, which may include any of the features discussed above, the purge-valve piston comprises at least an air-passage window that is arranged on a peripheral wall of the purge-valve piston and configured as an air-inlet of the second exhaust passage. The air-passage window is thus connected to the inlet line upstream and to the through opening and the outlet line downstream and is configured as an air-entering portion of the though-opening upstream of the valve member that controls flow through the second exhaust passage.

In another development, the purge-valve body comprises at least one inlet window arranged on a peripheral wall of the purge-valve body and configured as an air-inlet of the first exhaust passage. Preferably, the air-passage window and the inlet window are arranged in such a way that, in a closed state of the purge valve, a distance between a purge-valve seat, controlling the flow through the first exhaust passage, and the inlet window is less than a distance between said purge-valve seat and the air-passage window in the purge-valve piston. In this particular development, the position of the inlet air-passage window is arranged to be above that of the inlet windows during operation, thus avoiding possible oil-particles and moisture contamination at the valve member.

In another development, the reception of the purge signal triggers a provision of pressurized air that exerts a pressure on a distal end of the purge-valve piston, which causes the purge-valve piston to actuate against a spring force of a purge-valve spring element thereby opening the first exhaust passage. Since the purge-valve spring element is different from the valve spring element of the valve member, in developments including both spring element, the different opening pressures can be set independently with smaller pressure differences between maximal working pressure of the purge-valve and opening pressure of the valve-member, in particular acting as a safety valve.

The object of the invention is also achieved by an air-drying device in accordance with a second aspect of the present invention. The air-drying device is particularly suitable for drying air in a pressurized-air based system, in particular for a commercial vehicle. The air-drying device comprises an inlet unit for receiving air from an air-supply device of the pressurized air-based system. It also comprises an outlet unit for providing dried air to a dried-air reservoir of the pressurized air-based system. Also, the air-drying device comprises a drying unit that includes a first port connected to the inlet unit, a second port connected to the outlet unit and a drying chamber arranged between the first port and the second port and comprising a desiccant material. A purging unit is connected to the first port, wherein the purging unit comprises a purge valve according to the first aspect of the invention. The inlet line of the purge valve is connected to the first port. The purge valve is thereby arranged and configured to control a flow of exhaust air from the inlet line to the outlet line through the first exhaust passage and through the second exhaust passage. The first exhaust passage is opened upon reception of a purge signal, and the second exhaust passage is open when the pressure value of the pressurized air in the inlet line exceeds the threshold actuation pressure.

The air-drying device of the second aspect of the invention shares the advantages of the purge-valve of the first aspect.

In the following, developments of the air-drying device will be described.

In a particular development, the drying unit is configured to be operated in a charging mode and a regenerating mode. In the charging mode, the drying unit is configured to receive air through the first port, to dry the received air, and to provide dried air through the second port to the outlet unit. In the regenerating mode, the drying unit is configured to receive dried air through the second port and to provide exhaust air through the first port. Typically, the drying unit comprises an air-dryer cartridge and the dried air used in the regeneration phase is typically provided by the dried-air reservoir. In a particular embodiment, the drying unit comprises a twin air-cartridge having two units. During operation, one of the units is operated in the charging phase and provides dried air to the dried-air reservoir and to the remaining unit, which is then operating in the regenerating phase. After a predetermined time, the operation of the second unit is switched to the charging phase and the operation of the first unit is switched to the regeneration phase.

In another development, the air-drying device further comprising a safety valve connected to the inlet unit and configured to allow flow of air to the exterior when a pressure inside the air-drying device exceeds a second predetermined threshold actuation pressure. In the case that the air-drying device comprises a safety valve, the valve member of the purge-valve can be used as a second protection valve. The safety valve can be configured to be open when a pressure inside the air-drying device, in particular in the inlet unit, exceeds the second predetermined threshold actuation pressure. The value of said second predetermined threshold actuation pressure can be set higher or lower than the threshold actuation pressure of the valve member, depending on which one of the safety valve or the valve member is configured as the main protection valve or the secondary protection valve.

Thus, in a development where the safety valve is configured as a secondary protection valve, the second predetermined threshold actuation pressure is higher than the predetermined threshold actuation pressure for allowing exhaust air through the second exhaust passage in the purge-valve piston. Conversely, in an alternative embodiment where the safety valve is configured as a primary protection valve, the second predetermined threshold actuation pressure is lower than the predetermined threshold actuation pressure for allowing exhaust air through the second exhaust passage in the purge-valve piston.

A third aspect of the present invention is formed by a pressurized air-based system, in particular for a commercial vehicle. The pressurized air-based system is in particular an air-based braking system and/or an air-based suspension system. The pressurized air-based system comprises an air supply unit, in particular a compressor, for supplying air. The pressurized air-based system also comprises an air-drying device according to the second aspect of the invention and that is arranged and configured to receive air from the air supply unit, to dry the received air and to provide dried air to a dried-air reservoir. The pressurized air-based system also comprises a pressurized air-based actuator, in particular a brake unit or a suspension unit, configured to operate using dried air from the air reservoir.

Thus, the pressurized air-based system of the third aspect shares the advantages of the air-drying device of the second aspect.

A fourth aspect of the present invention is formed by a commercial vehicle that comprising a pressurized air-based system according to the third aspect and therefore it shares its advantages.

It shall be understood that the purge valve, the air-drying device, the pressurized air-based system braking system, and the commercial vehicle have similar and/or identical preferred embodiments, in particular, as described herein.

It shall be understood that a preferred embodiment of the present invention can also be any combination of the above embodiments.

BRIEF DESCRIPTION OF DRAWINGS

The foregoing aspects and many of the attendant advantages will become more readily appreciated as the same becomes better understood by reference to the following detailed description, when taken in conjunction with the accompanying drawings, wherein like reference numerals refer to like parts throughout the various views, unless otherwise specified:

FIG. 7 shows a schematic block diagram of a commercial vehicle according to the concept of the invention.

DETAILED DESCRIPTION

Figure 1:
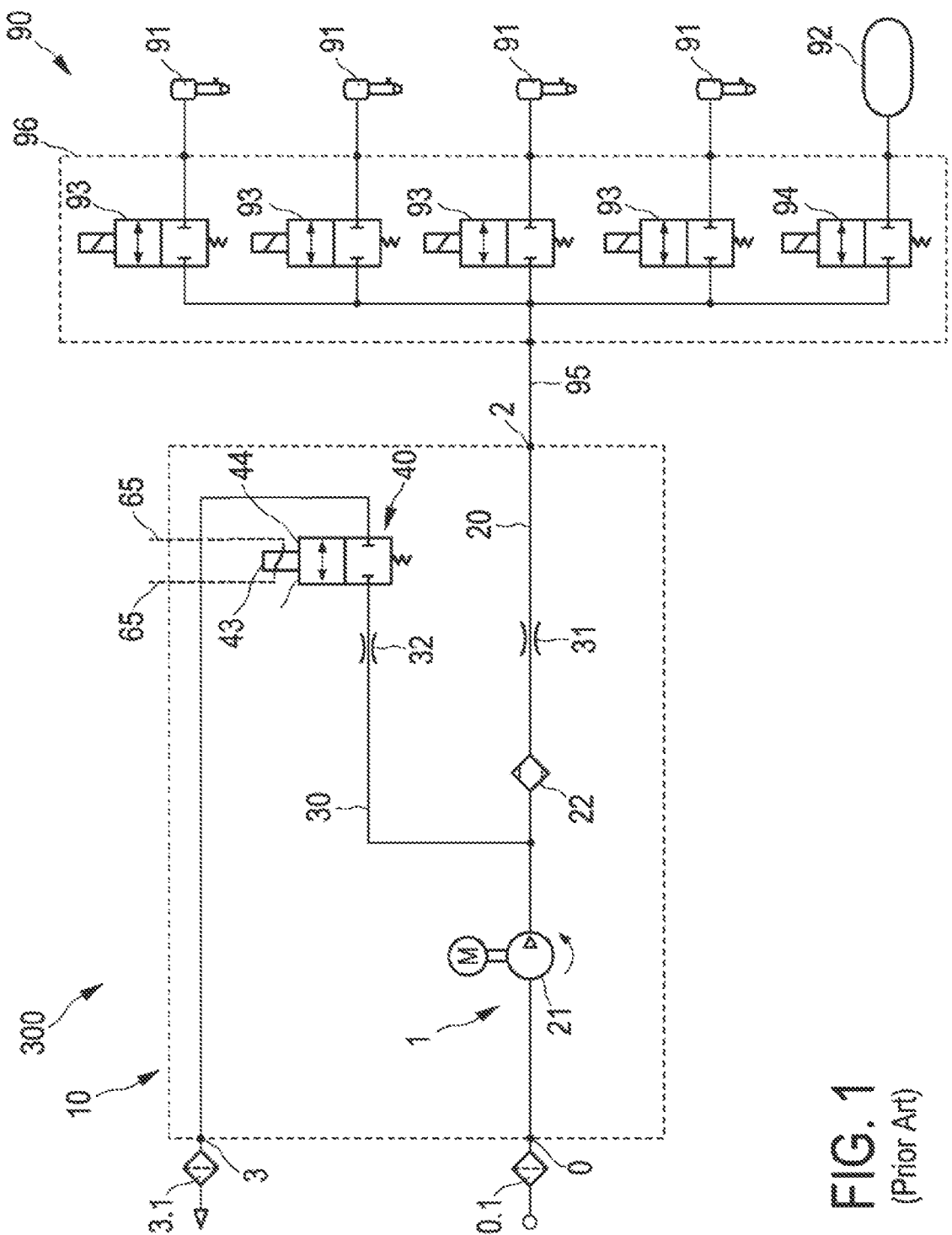
FIG. 1 shows a schematic diagram of basically known pressurized air-based system with a compressed air supply installation and an air suspension unit for explaining the technical background of the basic principle of layout of a pressurized air-based system, wherein a purge valve of a preferred embodiment can be integrated.

FIG. 1 shows a schematic diagram of a pressurized air-based system in the form of an air-based suspension system 300, with a compressed air supply installation 10 and a pneumatic system in the form of an air suspension unit 90 in this case. An air suspension unit generally refers to the system of tires, tire air, springs, shock absorbers and linkages that connects a vehicle to its wheels and allows relative motion between the two. The same reference numbers are used for identical or similar parts or parts with an identical or similar function, where appropriate. This particular air suspension unit 90 exhibits a number of bellows 91, which are each assigned to a wheel of a vehicle, and also an air-reservoir 92, for storing quickly accessible compressed air, typically dry, for the bellows 91. The bellows 91 and the air-reservoir 92 are connected to a common pneumatic line forming a header 95, which also creates the pneumatic connection between the compressed air supply installation 10 and the air suspension unit 90. A normally closed solenoid valve 93 is connected upstream of the bellows 91 in each case as a level control valve and a normally closed solenoid valve 94 is connected upstream of the reservoir 92 as a reservoir control valve. The solenoid valves 93, 94 are arranged in a valve manifold 96 of five solenoid valves in the present case. In a modified embodiment, the valve manifold 96 may exhibit other or fewer solenoid valves and/or solenoid valves arranged in a two-way valve manifold. A header refers quite generally to any kind of collecting line from which branch lines depart to bellows 91, a reservoir 92 and/or a line to the compressed air supply installation 10.

The compressed air supply installation 10 is used to operate the air suspension unit 90, or any other suitable air-based unit, such as a breaking unit (not shown in FIG. 1) and supplies the header 95 thereof via a compressed air connection 2. The compressed air supply installation 10 further exhibits an air supply 0 for drawing air, for example via a filter 0.1, and a vent port 3 to release air, for example via a filter 3.1 into the environment. Filter 3.1 or 0.1 is positioned downstream of the vent port 3 in the venting direction or upstream of the air supply 0 contrary to the filling direction. The air suspension unit 90 is arranged downstream of the compressed air connection 2 in the filling direction. The compressed air supply installation 10 moreover exhibits an air condenser in the form of an air compressor 21 in a pneumatic connection between the air supply 0 and the compressed air supply 1, the compressor being driven by a motor M and provided to supply the compressed air supply 1 with compressed air. An air-drying unit 22 and, optionally, a first throttle 31, in the form of a regeneration throttle in this case, are further disposed in a pneumatic connection between the compressed air supply 1 and the compressed air connection 2. The filter 0.1, the air supply 0, the air compressor 21, the compressed air supply 1, the air-drying unit 22 and the first throttle 31 are arranged along with the compressed air connection 2 in a compressed airline 20 forming the pneumatic connection to the header 95 in this order.

In a pneumatic connection between the compressed air supply line 1 and the vent port 3 in the compressed air supply installation 10, a purge valve arrangement in the form of a controllable solenoid valve arrangement 40 with a solenoid part 43 and a pneumatic part 44 for releasing exhaust air into a vent port 3 is provided. The solenoid valve arrangement 40 is configured in a venting line 30 forming the pneumatic connection, which may exhibit a second throttle 32 as a vent throttle between the compressed air supply 1 and the solenoid valve arrangement 40. The solenoid valve arrangement 40 in this case is formed with a normally closed, single solenoid valve, which is activated via the control line 65 that provides a purge signal.

A line section of the venting line 30 forming a pneumatic chamber on the pressure source side is advantageously provided for the pneumatic attachment of the solenoid valve arrangement 40 and the second throttle 32 to the compressed air supply line 20 to compressed air supply 1 in this case. The connection to the compressed air supply 1 between the air compressor 21 and the air-drying unit 22 results in compressed air being vented or purged via the venting line 30 when the compressed air supply installation 10 is purged, the compressed air being removed upstream of the air-drying unit 22, to put it simply, as undried air.

It is evident from the depiction of the embodiment in FIG. 1 that the compressed air Supply installation 10 is configured with a solenoid valve arrangement 40 as a directly controlled vent solenoid valve arrangement, with which a direct connection of the entire compressed air volume is possible through actuation via a control line 65. The symbolically represented solenoid valve of the solenoid valve arrangement 40 is the single valve of the solenoid valve arrangement 40. This measure allows a quick and flexible venting of the air suspension unit 90 or of the compressed air supply installation 10, without an additional control valve being necessary.

Figure 2A:
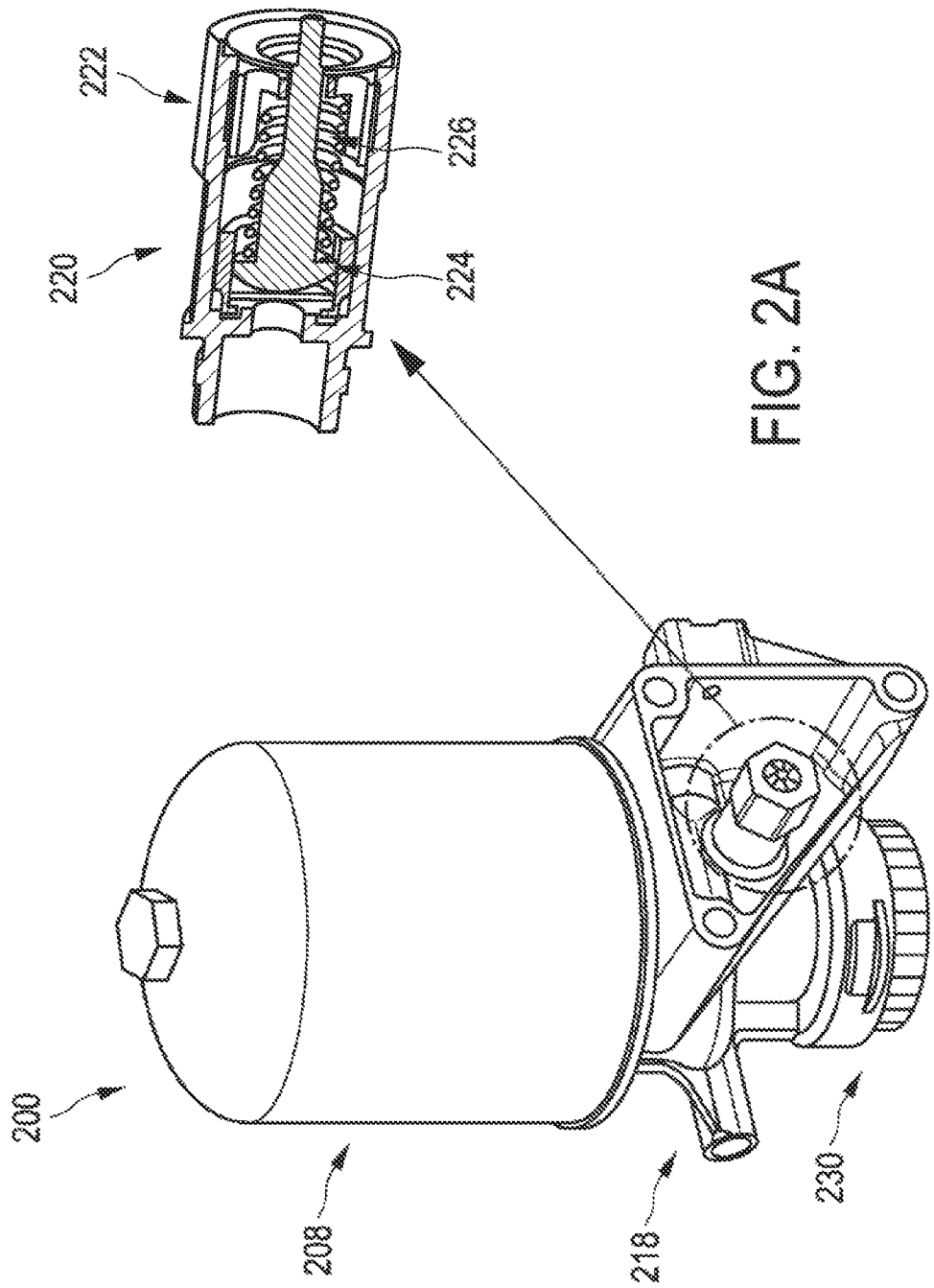
FIG. 2A shows a structure of an air drying-device with a safety valve for comparison to a preferred embodiment.

FIG. 2A shows a schematic diagram of an air-drying device 200 comprising an air-drying unit 208 in the form of an air-cartridge, an air-flow control 218 unit with the necessary pneumatic connections for connecting the air-drying device 200 to a pressurized air-based system. The air-drying device 200 comprises purge valve 230 represented as a solenoid valve that is controllable by providing a purge signal S, and a safety valve 220, shown in cross section in the inset of FIG. 2A. The safety valve 220 is arranged and configured to control a flow of air from the air-drying device 200 to an exterior thereof when the pressure inside the air-drying device exceeds a predetermined pressure threshold. The safety valve 220, as shown in the cross section, comprises a safety-valve body 222, and a safety-valve piston 224 arranged inside the safety-valve body 222 and configured to actuate against a spring force of a safety-valve spring element 226. When the pressure is below the predetermined pressure threshold the safety valve 220 is closed. When the pressure acting on the safety-valve piston 224 exceeds the predetermined pressure threshold, the safety-valve piston 224 compresses the safety-valve spring element 226 to an extent where a passage is formed that allows the flow of air to the exterior, thereby reducing the pressure inside the air-drying device 200.

Figure 2B:
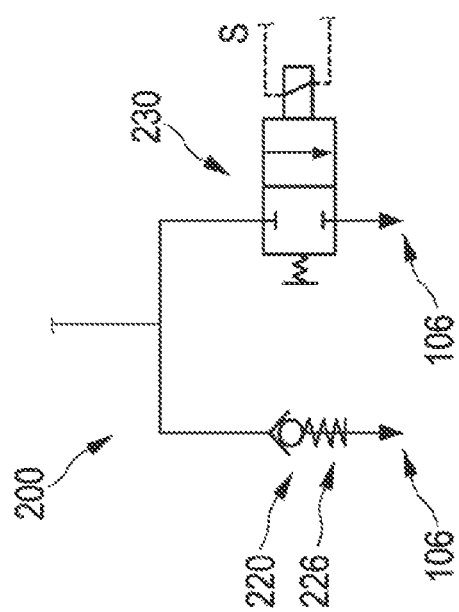
FIG. 2B shows a schematic circuit diagram of exhausting and purging passages of the air-drying device of FIG. 2A as basically known.

FIG. 2B shows a schematic circuit diagram of the air-drying device 200, in particular of the exhausting and purging passages of the air-drying device 200. The air in the air-flow control unit 218 of the air-drying device 200 can be purged upon provision of a purging signal S that causes the purge valve 230 to open. The purged air is directed to the environment or exterior 106 of the air-drying device 200. If however, the air pressure in the air-flow control unit 218 exceeds the predetermined pressure threshold the piston acts against the spring force of the safety-valve spring element 226 causing the safety valve 220 to open thereby releasing air to the exterior 106 and causing the air pressure in the air-flow control unit to decrease.

Figure 3:
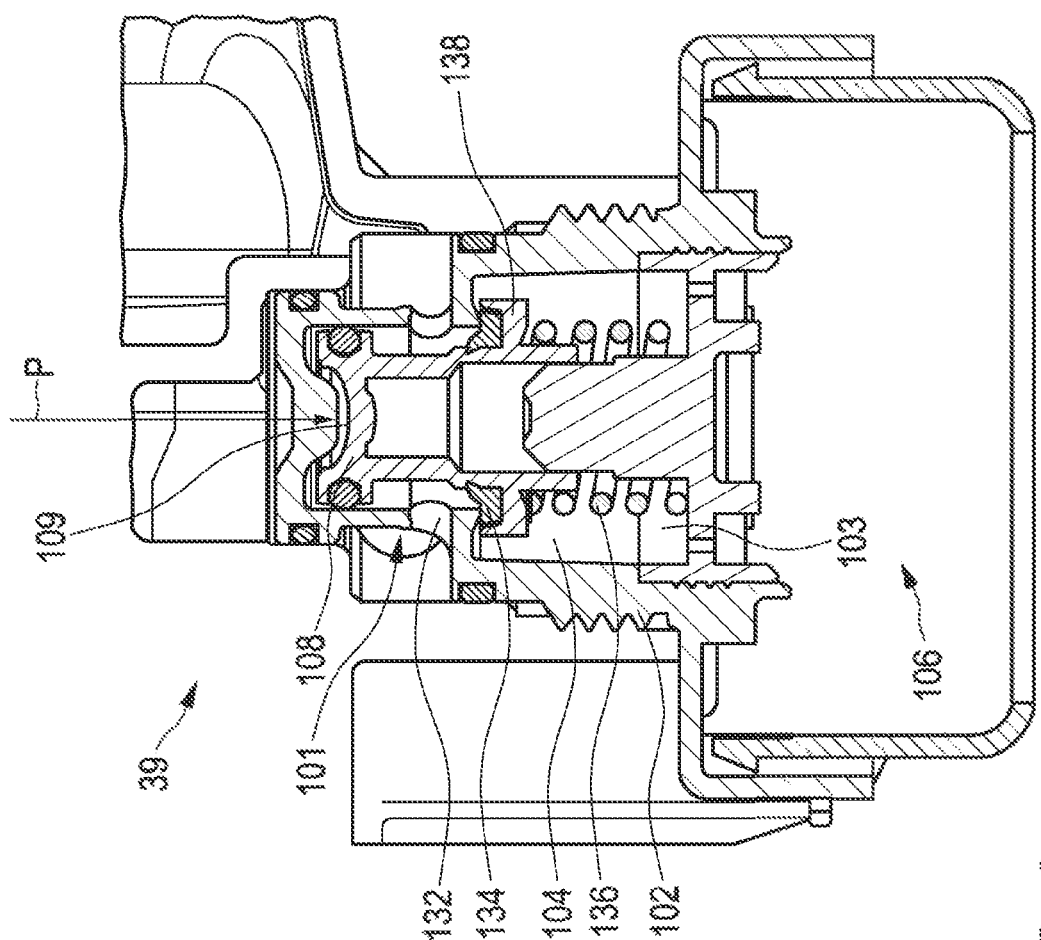
FIG. 3 shows a schematic cross sectional view of a purge valve with an integrated safety function for comparison to a preferred embodiment.

FIG. 3 shows a schematic cross sectional view of a purge valve 39 with an integrated safety function that is part of an air-drying device (not shown). The purge valve 39 comprises a purge-valve body 102 that forms a first exhaust passage 104 that connects an inlet line 101 to an outlet line 103 that is in turn connected to an exterior 106 of the purge valve 39. In the purge valve 39, a purge-valve piston 108 is arranged inside the purge-valve body 102 to control a flow of exhaust air from the inlet line 101 through the first exhaust passage 104 to the outlet line 103. The purge-valve body 102 comprises at least one inlet window 132 arranged on a peripheral wall of the purge-valve body 102 and configured as an air-inlet of the first exhaust passage 104.

Operating under the main function of purging, a regeneration/solenoid valve (not shown) provides an air signal to open the purge valve 39. A pressure P acts on the top 109 of the purge-valve piston 108 as indicated FIG. 1, which acts against a spring force of a purge-valve spring element 136. The purge-valve spring element 136 is arranged and configured to ensure tightness of the purge valve 39 at a maximum working pressure. The purge valve 39 is also configured to perform an additional function as a safety valve. The pressure from the main chamber of the drying device also acts on an annular protrusion 138 radially protruding from the purge-valve piston and configured to contact the purge-valve body 102 at a valve seat 134 in a closed position of the purge-valve 39. The annular protrusion offers a lower area than the top 109 of the purge-valve piston 108 onto which the pressure P acts, and also acts against the same spring force of purge-valve spring element 136. The spring force of purge-valve spring element 136 is calculated to achieve a proper movement of the purge-valve piston 108 for given cut-out and cut-in pressures. A balance between the top surface 109 of the purge-valve piston and the surface of the annular protrusion is designed to ensure proper sealing performance and full opening during the regenerating phase of the air-dyer, where the purge function controlled by the purge signal S takes place. Typically, the opening pressure of the purge-valve in the so-called safety mode needs to be set high enough (usually more than 4 bar higher than the maximal working pressure) to avoid leakage of the purge-valve 39 during normal operation. Also, it ensures the tightness of the air-drying device considering relaxation of the purge-valve spring element 136 during its lifetime. This is commonly achieved by using additional washer configuration, for example, two 0.5 mm washers to provide the required spring compression. However, such large pressure differences between cut-out or maximal working pressure and safety opening pressure in the safety mode is not acceptable in view of potential failures caused by system over-pressure. Furthermore, the adjustment of the opening pressure in the safety mode is complex and time-consuming. Also a large difference between maximal working pressure and opening pressure in the safety mode reduces the possibility of using purge-valve 39 in application cases where the required difference is not so large.

Figure 4:
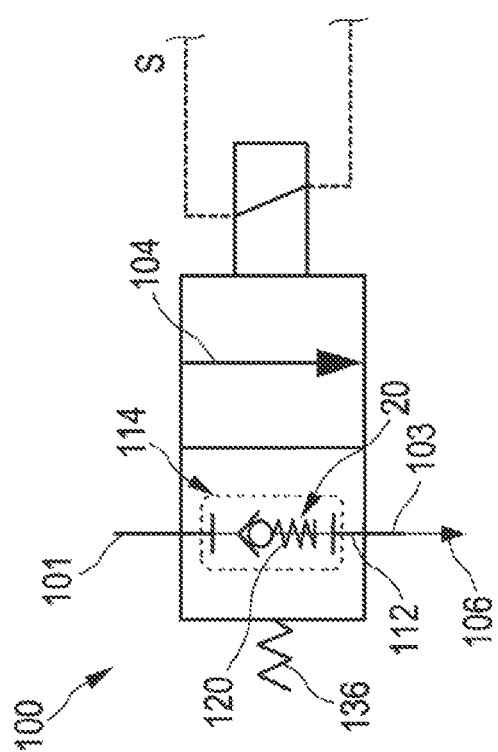
FIG. 4 shows a circuit diagram of a purge valve of a preferred embodiment in accordance with the concept of the invention.
Figure 5:
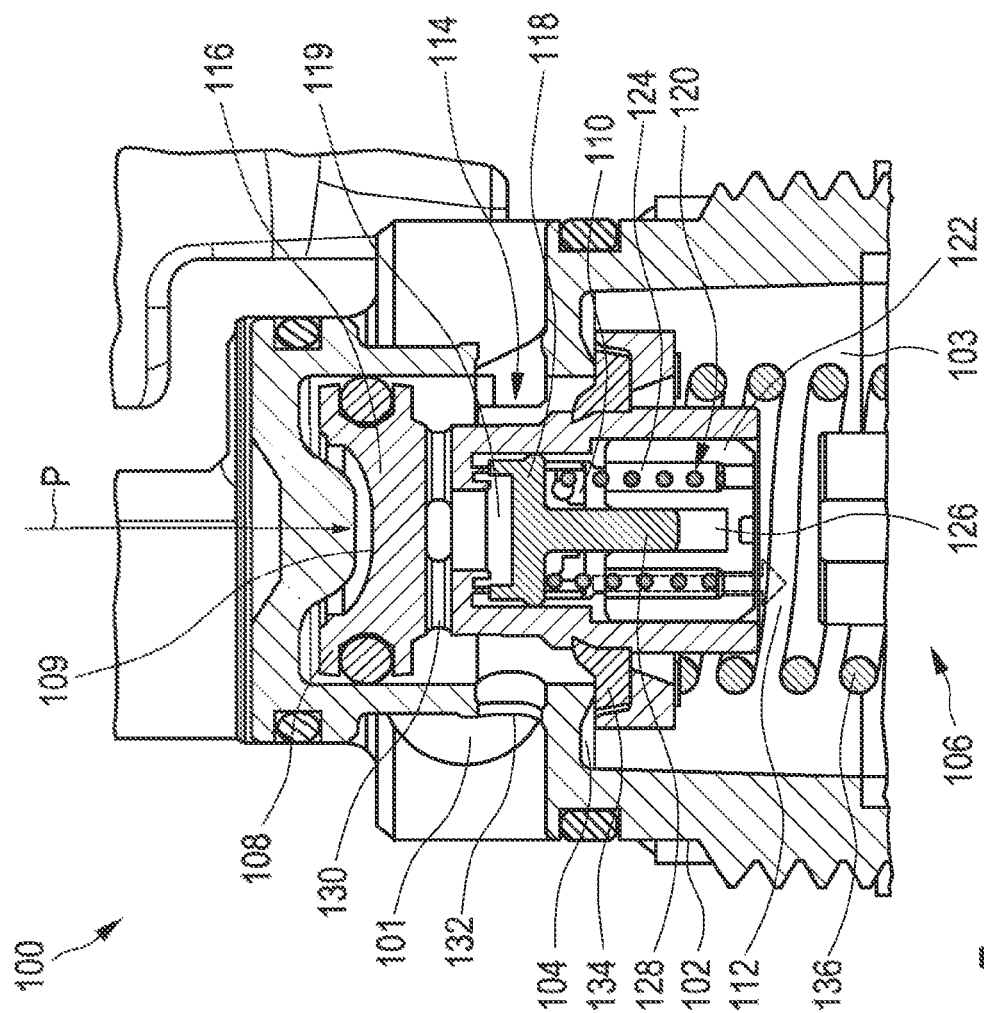
FIG. 5 shows a cross-sectional view of the purge valve of a preferred embodiment in accordance with the concept of the invention.

FIG. 4 shows a circuit diagram of a purge valve 100 in accordance with the invention and FIG. 5 shows a cross sectional view of the purge valve 100 in accordance with the invention.

According to the circuit diagram of the purge valve 100 shown in FIG. 4, the inlet line 101 is connectable to a first exhaust passage 104 and a second exhaust passage 112. Airflow through the first exhaust passage is controlled by purge signal S that causes the solenoid valve to switch to an open state. Airflow through the second exhaust passage is controlled by valve member 114, which is integrated within the solenoid purge valve, as it will be explained below with respect to FIG. 5. Both passages lead to an outlet line 103 that leads to an exterior of the purge valve 100.

As shown in FIG. 5, the purge valve 100 comprises a purge-valve body 102 that forms a first exhaust passage 104 that connects an inlet line 101 to an outlet line 103 that is in turn connected to an exterior 106 of the purge valve 100. A purge-valve piston 108 is arranged inside the purge-valve body 102 to control a flow of exhaust air from the inlet line 101 through the first exhaust passage 104 to the outlet line 103. The shape of the purge valve body and an outer shape of the purge-valve piston can be essentially the same as those of purge valve 39 of FIG. 3, so that an existing purge valve 39 can be replaced by purge valve 100. As in the case of purge-valve 39 of FIG. 3, the purge-valve piston 108 of purge-valve 100 is actuable upon reception of a purge signal S. The purge-valve piston 108 of purge valve 100 further comprises a through opening 110 that is configured to form a second exhaust passage 112 for connecting the inlet line 101 to the outlet line 103. The second exhaust passage 112 is established separately from the first exhaust passage 104, as it can be seen in the circuit diagram of FIG. 4.

Also, as indicated in FIG. 5, a valve member 114 is arranged in the through opening 110. The valve member 114 is configured to control a flow of exhaust air through the second exhaust passage 112. The valve member 114 is arranged and configured to be actuated by pressurized air when a pressure value of the pressurized air in the inlet line 101 exceeds a threshold actuation pressure, or, in other words a safety opening pressure.

The purge valve 100 is suitable for air-drying device, such as air-drying device 200. As shown in FIG. 5, the solution with integrated safety valve function in the form of valve member 114 is implemented directly into the purge-valve piston 108. The exemplary purge-valve 100 allows a decrease in the differences between cut-out or maximal working pressure and safety opening pressure to around 1:1.5. Moreover, the integration of an additional safety function in an already existing purge-valve body 102 does not affect the external dimensions thereof.

In the purge valve 100 of FIG. 5, the valve member 114 comprises a valve-body 116 formed by the purge-valve piston 108. Further, the valve member 114 comprises a valve-piston 118 that is arranged inside the through opening 110 and configured to actuate against a spring force of a valve spring element 120. This valve spring element 120 is different from the purge-valve spring element 136, thus enabling a decoupling of the purging function and the safety function.

The valve member 114 advantageously comprises an adjusting nut 122 that is arranged inside the through opening 110. The adjusting nut comprises an annular recess 124 that is arranged and configured to house the valve spring element 120 and a central recess 126 arranged and configured to house a piston rod 128 attached to the valve-piston 118. In this annular recess forms part of the second exhaust passage and it provides a seat for the valve spring element 120 while having openings that let the air flow through them. The value of opening pressure i.e. the threshold actuation pressure can be set using the adjusting nut 122, which is more precise and less time consuming than the known adjusting process using washers described above with reference to FIG. 3. Additionally, the integrated valve member avoids the need of using an external safety valve and also reduces the cost production since no additional port and its machining is required.

The purge-valve piston 108 advantageously comprises at least an air-passage window 130 arranged on a peripheral wall of the purge-valve piston 108 and configured as an air-inlet of the second exhaust passage 112. The air-passage window 130 is arranged radially and forms a first section of the second exhaust passage 122. Air in the air-passage window acts against a valve seat 119 of the valve member 114.

The purge-valve body 102 of purge-valve 100 also comprises at least one inlet window 132 arranged on a peripheral wall of the purge-valve body 102 and configured as an air-inlet of the first exhaust passage 104. In particular, in a closed state of the purge valve 100, a distance between a purge-valve seat 134 and the inlet window 132 is less than a distance between said purge-valve seat 134 and the air-passage window 130 in the purge-valve piston 108. Such a configuration where the position of the air-passage windows 130 is above that of the inlet windows 132 avoids possible contamination due to oil particles and moisture at the integrated valve member 114.

The reception of the purge signal S (see FIG. 4) triggers a provision of pressurized air that exerts a pressure P on a distal top end 109 of the purge-valve piston 108, which causes the purge-valve piston 108 to actuate against the spring force of the purge-valve spring element 136, thereby opening the first exhaust passage 104.

Figure 6:
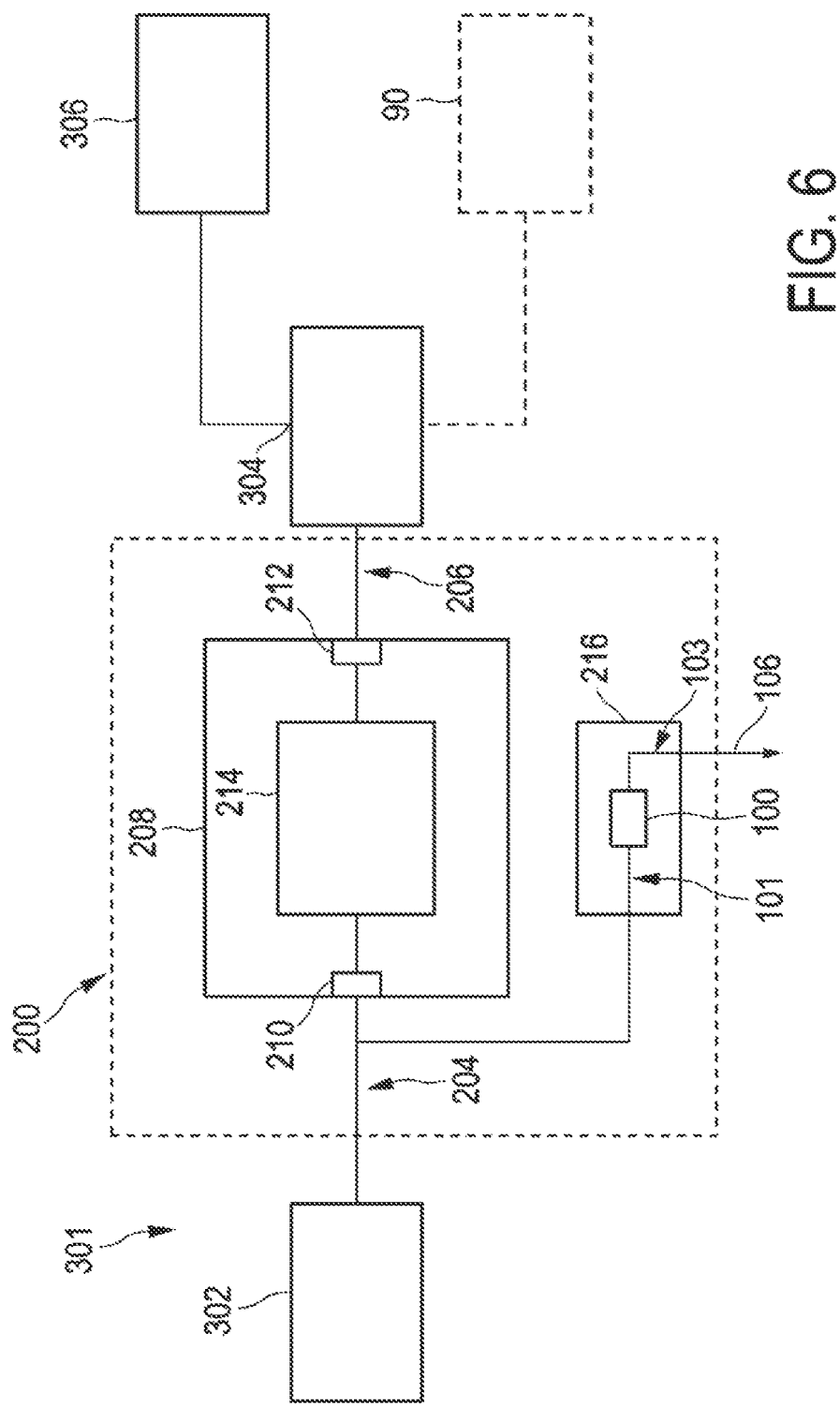
FIG. 6 shows a schematic diagram of another pressurized air-based system, in the form of an air-based braking system in accordance with the concept of the invention.

FIG. 6 shows a schematic diagram of another pressurized air-based system, in the form of an air-based braking system 301. An air-based braking system or, more formally, a compressed air brake system, is a type of friction brake for vehicles in which compressed air pressing on a piston is used to apply the pressure to the brake pad needed to stop the vehicle. Air brakes are advantageously used in large heavy vehicles, particularly those having multiple trailers, which must be linked into the brake system, such as trucks, buses, trailers, and semi-trailers.

The pressurized air-based systems 300 of FIG. 1 and 301 of FIG. 6 can be used in a commercial vehicle, as it will be explained with reference to FIG. 7. The air-based system 301 comprises a compressed-air supply unit 302, for instance a compressor, which is arranged and configured to provide compressed air to the air-based system. The air-based system comprises an air-drying device 200 with a purge-valve in accordance with the invention, which is connected to the compressed-air supply unit 302 and configured to receive the compressed air, to dry the received compressed air and to provide dried air via an outlet port. The air-based system also comprises a dried-air reservoir 304 or dried-air supply, which is connected to the outlet port of the air-drying device 200 and configured to store dried air. The air-based braking system comprises a braking unit 306. Additionally, as indicated by the dotted line, the pressurized air-based system 300B can also supply dried air for operation of a suspension unit 90, as explained above with reference to FIG. 1. The braking unit 306 and/or the suspension unit 90 are connected to the dried-air reservoir 304. The braking unit 306 is configured to apply a braking force to wheels of the vehicle upon provision of dried air from the air-reservoir 304. The suspension unit 90 is configured to apply damping function on the vehicle upon provision of dried air from the air-reservoir 304. Damping generally refers to the control of motion or oscillation, as seen with the use of hydraulic/pneumatic gates and valves in a vehicle's shock absorber. Damping controls the travel speed and resistance of the vehicle's suspension. An undamped car will oscillate up and down. With proper damping levels, the vehicle will settle back to a normal state in a minimal amount of time. Most damping in modern vehicles can be controlled by increasing or decreasing the resistance to fluid flow in the shock absorber.

Regarding the air-drying device 200 of FIG. 6, it comprises an inlet unit 204 for receiving air from the air-supply device 302 of the pressurized air-based system 300. Further, an outlet unit 206 is configured for providing dried air to a dried-air reservoir 304 of the pressurized air-based system 300. A drying unit 208 comprises a first port 210 connected to the inlet unit 204, a second port 212 connected to the outlet unit 206, and a drying chamber 214 arranged between the first port 210 and the second port 212 and typically comprising a desiccant material and sometimes additionally a filtering unit for particles or oil. Furthermore, a purging unit 216 is connected to the first port 210, wherein the purging unit 216 comprises, a purge valve 100 according to the invention. The inlet line 101 is connected to the first port 210, and the purge valve 100 is arranged and configured to control a flow of exhaust air from the inlet line 101 to the outlet line 103 through the first exhaust passage 104 and through the second exhaust passage 112 as explained above with reference to FIGS. 4 and 5.

FIG. 7 shows a schematic block diagram of a commercial vehicle according 400 to the invention. The commercial vehicle comprises a suspension system that includes a suspension unit 90 connected to the wheels 402 of the vehicle 400. As stated above, the suspension unit includes the system of tires, tire air, springs, shock absorbers and linkages that connects the vehicle 400 to its wheels 402 and allows relative motion between the two. The suspension system 300 is advantageously configured to apply damping function on the vehicle 400 based on the provision of dried air from the air-reservoir 304 to the suspension unit 90. The commercial vehicle 400 also comprises a braking system that includes a braking unit 306, wherein typically compressed air pressing on a piston is used to apply the pressure to the brake pad needed to stop the vehicle 400. The commercial vehicle may comprise an electronic control unit 450 which is connected (see dotted lines in FIG. 7) to the compressed-air supply unit 302, the air-drying device 200 comprising a purge valve 100 in accordance with the invention and optionally also to the air reservoir 304, and/or to the suspension unit 90 and/or to the braking unit 206 and configured to control operation of the compressed-air supply unit 302 and of the air-drying device 200, for example by providing the purge signal S. For instance, the electronic control unit may receive status information from the air reservoir 304, for example pertaining to the pressure of the air stored therein, or from the braking and/or suspension units 306, 90, for example pertaining its current operation, and based on the received status information, operate the compressed-air supply unit 302 and the air-drying device 200 in accordance with predetermined operation parameter.

In summary, the invention is directed to a purge valve with an integrated safety function, suitable for an air-drying device. In the purge valve, a purge-valve body forms a first exhaust passage for connecting an inlet line to an outlet line. A purge-valve piston is arranged inside the purge-valve body to control a flow of exhaust air through the first exhaust passage upon reception of a purge signal. The purge-valve piston comprises a through opening being configured to form a second exhaust passage for connecting the inlet line to the outlet line. A valve member is arranged in the through opening and is configured to control a flow of exhaust air through the second exhaust passage. The valve member is configured to be actuated by pressurized air when a pressure value in the inlet line exceeds a threshold actuation pressure.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5, % of the numerical values. Further, The term "about" applies to both numerical values when associated with a range of values. Moreover, the term "about" may apply to numerical values even when not explicitly stated.

Generally, as used herein a hyphen "-" or dash "—" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

LIST OF REFERENCE SIGNS (PART OF THE DESCRIPTION)

0 Air supply
0.1 Filter
1 Compressed air supply
2 Compressed air connection
3 Vent port 3.1 Filter
10 Compressed air supply installation
20 Compressed airline
21 Air compressor
22 Air-drying unit
30 Venting line
31 First throttle
32 Second throttle
39 Purge valve
40 Controllable solenoid valve arrangement
43 Solenoid part
44 Pneumatic part
65 Control line
90 Suspension unit
91 Bellow
92 Air-reservoir
93 Solenoid valve
94 Solenoid valve
95 Header
96 Valve manifold
100 Purge valve
101 Inlet line
102 Purge-valve body
103 Outlet line
104 First-exhaust passage
106 Exterior, environment
108 Purge-valve piston
109 Top of purge-valve piston
110 Through opening
112 Second exhaust passage
114 Valve member
116 Valve body
118 Valve-piston
119 Valve seat of valve member
120 Valve spring element
122 Adjusting nut
124 Annular recess
126 Central recess
128 Piston rod
130 Air-passage window
132 Inlet window
134 Valve seat
136 Purge-valve spring element
138 Annular protrusion
200 Air-drying device
204 Inlet unit
206 Outlet unit
208 Air-drying unit
210 First port
212 Second port
214 Drying chamber
216 Purging unit
218 Air-flow control unit
220 Safety valve
222 Safety-valve body
224 Safety-valve piston
226 Safety-valve spring element
230 Purge valve
300 Air-based suspension system
301 Air-based braking system
302 Compressed-air supply unit
304 Dried-air reservoir
306 Braking unit
400 Commercial vehicle
402 Wheel
450 Electronic control unit
M Motor
P Pressure
S Purge signal

What is claimed is:

1. A purge valve for an air-drying device, the purge valve comprising:
a purge-valve body forming a first exhaust passage for connecting an inlet line to an outlet line connected to an exterior of the purge valve; wherein
a purge-valve piston is arranged inside the purge-valve body to control a flow of exhaust air from the inlet line through the first exhaust passage to the outlet line; wherein the purge-valve piston is actuable upon reception of a purge signal,
wherein
the purge-valve piston further comprises a through opening being configured to form a second exhaust passage for connecting the inlet line to the outlet line, the second exhaust passage being established separately from the first exhaust passage, and wherein
a valve member is arranged in the through opening and the valve member is configured to control a flow of exhaust air through the second exhaust passage, wherein the valve member is arranged and configured to be actuated by pressurized air when a pressure value of pressurized air in the inlet line exceeds a threshold actuation pressure.

2. The purge valve of claim 1, wherein the valve member comprises a valve body formed by the purge-valve piston.

3. The purge valve of claim 1, wherein the valve member comprises a valve piston configured to actuate against a spring force of a valve spring element.

4. The purge valve of claim 3, wherein the valve member further comprises an adjusting nut arranged inside the through opening and comprising an annular recess arranged and configured to house the valve spring element and a central recess arranged and configured to house a piston rod attached to the valve piston.

5. The purge valve of claim 1, wherein the purge-valve piston comprises at least an air-passage window arranged on a peripheral wall of the purge-valve piston and configured as an air-inlet of the second exhaust passage.

6. The purge valve of claim 5, wherein the purge-valve body comprises at least one inlet window arranged on a peripheral wall of the purge-valve body and configured as an air-inlet of the first exhaust passage.

7. The purge valve of claim 6, wherein in a closed state of the purge valve, a distance between a purge-valve seat and the at least one inlet window is less than a distance between said purge-valve seat and the air-passage window on the purge-valve piston.

8. The purge valve of claim 1, wherein the reception of the purge signal triggers a provision of pressurized air that exerts a pressure on a distal end of the purge-valve piston, which causes the purge-valve piston to actuate against a spring force of a purge-valve spring element thereby opening the first exhaust passage.

9. An air-drying device for drying air in a pressurized-air based system for a commercial vehicle, the air-drying device comprising:
an inlet unit for receiving air from an air-supply device of the pressurized air-based system;
an outlet unit for providing dried air to a dried-air reservoir of the pressurized air-based system;
a drying unit comprising a first port connected to the inlet unit, a second port connected to the outlet unit, and a drying chamber arranged between the first port and the second port and comprising a desiccant material;

a purging unit connected to the first port, wherein the purging unit comprises, a purge valve according to claim 1, wherein the inlet line is connected to the first port, the purge valve being arranged and configured to control a flow of exhaust air from the inlet line to the outlet line through the first exhaust passage and through the second exhaust passage.

10. The air-drying device of claim 9, wherein the drying unit is configured to be operated in a charging mode and a regenerating mode, wherein in the charging mode, the drying unit is configured to receive air through the first port, to dry the received air and to provide dried air through the second port to the outlet unit, and, in the regenerating mode, the drying unit is configured to receive dried air through the second port and to provide exhaust air through the first port.

11. The air-drying device of claim 9 further comprising a safety valve connected to the inlet unit and configured to allow a flow of air to the exterior of the air-drying device when a pressure inside the air-drying device exceeds a second threshold actuation pressure.

12. The air-drying device of claim 11, wherein the second predetermined threshold actuation pressure is higher than the threshold actuation pressure for allowing exhaust air through the second exhaust passage in the purge-valve piston.

13. A pressurized air-based system for a commercial vehicle, the pressurized air-based system comprising:
  an air supply unit for supplying air;
  an air-drying device according to claim 9, arranged and configured to receive air from the air supply unit, to dry the received air and to provide dried air to a dried-air reservoir
  a pressurized air-based actuator, in particular a brake unit or a suspension unit, configured to operate using dried air from the dried-air reservoir.

14. A commercial vehicle comprising a pressurized air-based system according to claim 13.

* * * * *